(12) United States Patent
Takizawa

(10) Patent No.: US 8,493,599 B2
(45) Date of Patent: Jul. 23, 2013

(54) PRINTING SYSTEM, PRINTING APPARATUS, PRINTING METHOD, AND PROGRAM FOR IMPLEMENTING THE PRINTING SYSTEM AND THE PRINTING METHOD

(75) Inventor: Masahiro Takizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 12/967,632

(22) Filed: Dec. 14, 2010

(65) Prior Publication Data

US 2011/0157635 A1 Jun. 30, 2011

(30) Foreign Application Priority Data

Dec. 28, 2009 (JP) ................................. 2009-297377

(51) Int. Cl.
*G06F 15/00* (2006.01)
(52) U.S. Cl.
USPC .......................................... 358/1.15; 707/999
(58) Field of Classification Search
None
See application file for complete search history.

(56) References Cited

U.S. PATENT DOCUMENTS

| 8,130,394 B2* | 3/2012 | Matsuda ...................... 358/1.15 |
| 2004/0028436 A1* | 2/2004 | Suzuki et al. ................. 399/381 |
| 2006/0285890 A1* | 12/2006 | Ng ............................... 399/329 |
| 2007/0182991 A1* | 8/2007 | Matsuda ...................... 358/1.15 |
| 2007/0280760 A1* | 12/2007 | Nishikata et al. ............ 399/341 |
| 2009/0097046 A1 | 4/2009 | Ohta |
| 2009/0231626 A1* | 9/2009 | Koyano ....................... 358/1.18 |
| 2009/0268236 A1* | 10/2009 | Miyata ........................ 358/1.15 |
| 2009/0279910 A1* | 11/2009 | Shiori ............................ 399/50 |

FOREIGN PATENT DOCUMENTS

| JP | 2007-011028 A | 1/2007 |
| JP | 2008-139589 A | 6/2008 |

* cited by examiner

*Primary Examiner* — Twyler Haskins
*Assistant Examiner* — Helen Q Zong
(74) *Attorney, Agent, or Firm* — Canon USA Inc IP Division

(57) ABSTRACT

A printing apparatus includes a generation unit configured to generate first print data and second print data based on input print data, a printing unit configured to generate first image data by executing image processing on the first print data generated by the generation unit and to print the generated first image data on a sheet, a transmission unit configured to transmit the second print data generated by the generation unit to another printing apparatus connected to the printing apparatus, and a conveyance unit configured, in order to print the second print data transmitted by the transmission unit, to convey the sheet having the first image data printed thereon by the printing unit to the another printing apparatus.

9 Claims, 9 Drawing Sheets

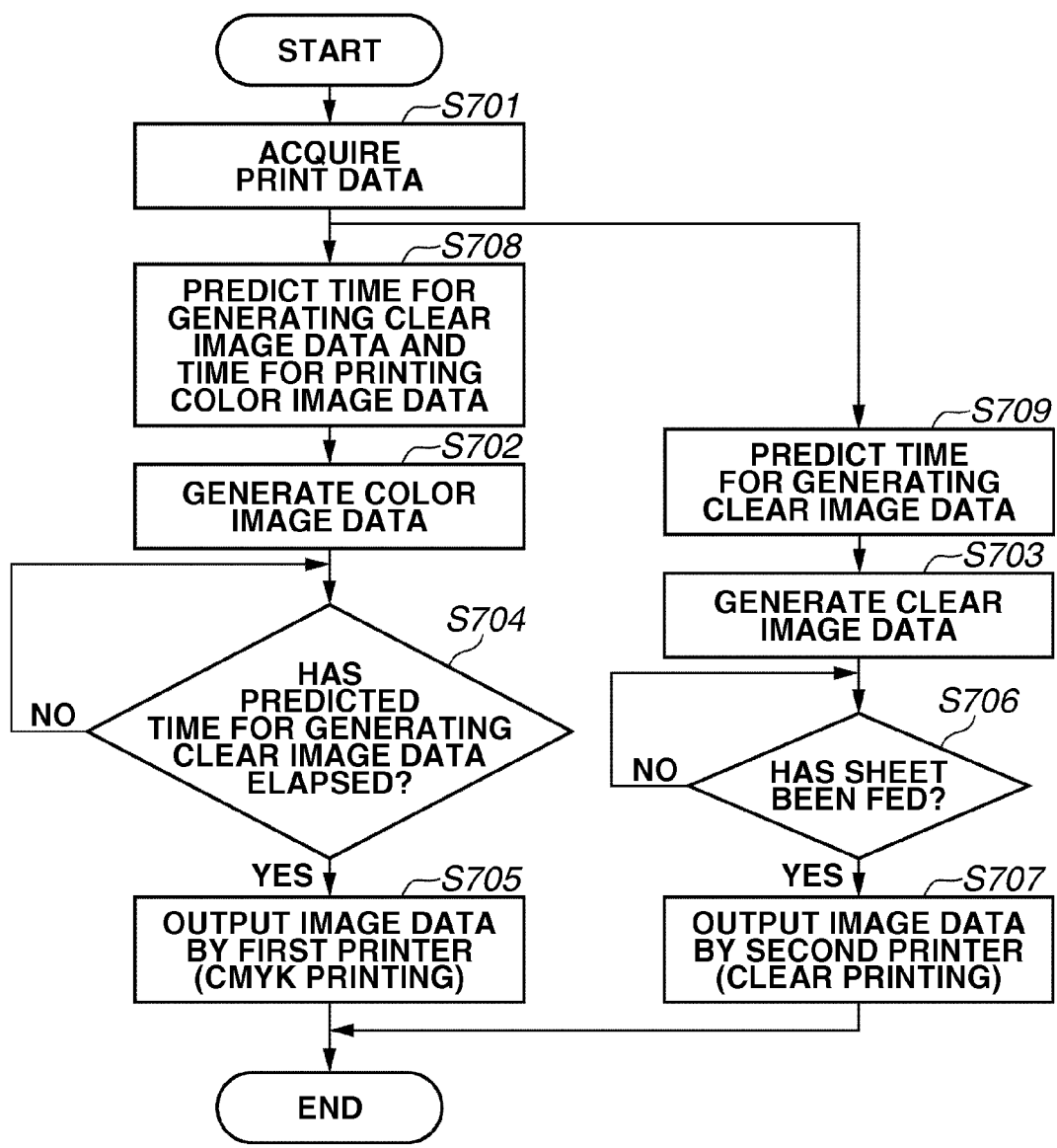

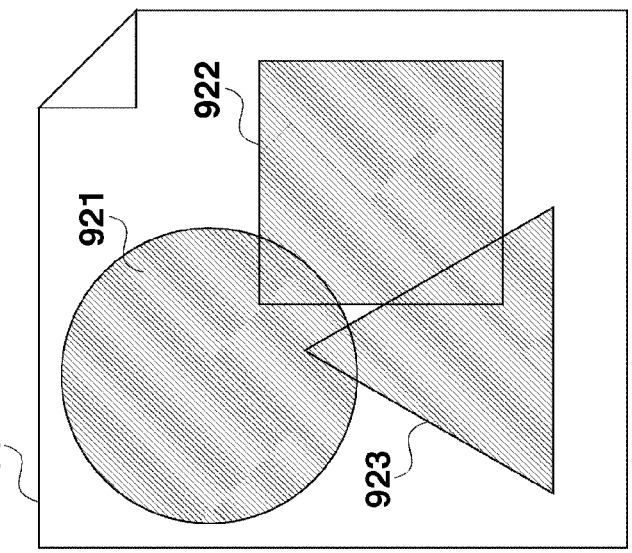
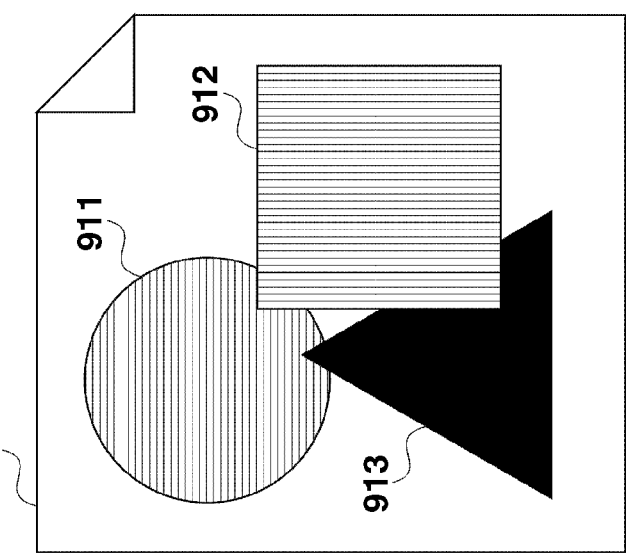

FIG.8

| PAPER FEED ACCESSORY / PAPER SIZE | MANUAL FEED TRAY | PAPER FEED ACCESSORY 1 (LOWER STAGE) | PAPER FEED ACCESSORY 1 (UPPER STAGE) | PAPER FEED ACCESSORY 2 (LOWER STAGE) | PAPER FEED ACCESSORY 2 (UPPER STAGE) |
|---|---|---|---|---|---|
| POSTCARD | 2 SECONDS | NOT AVAILABLE | NOT AVAILABLE | NOT AVAILABLE | NOT AVAILABLE |
| A4 | 2.5 SECONDS | 1 SECOND | 1.2 SECONDS | 1.5 SECONDS | 1.6 SECONDS |
| A3 | 3 SECONDS | 2 SECONDS | 2.3 SECONDS | 2.5 SECONDS | 2.6 SECONDS |

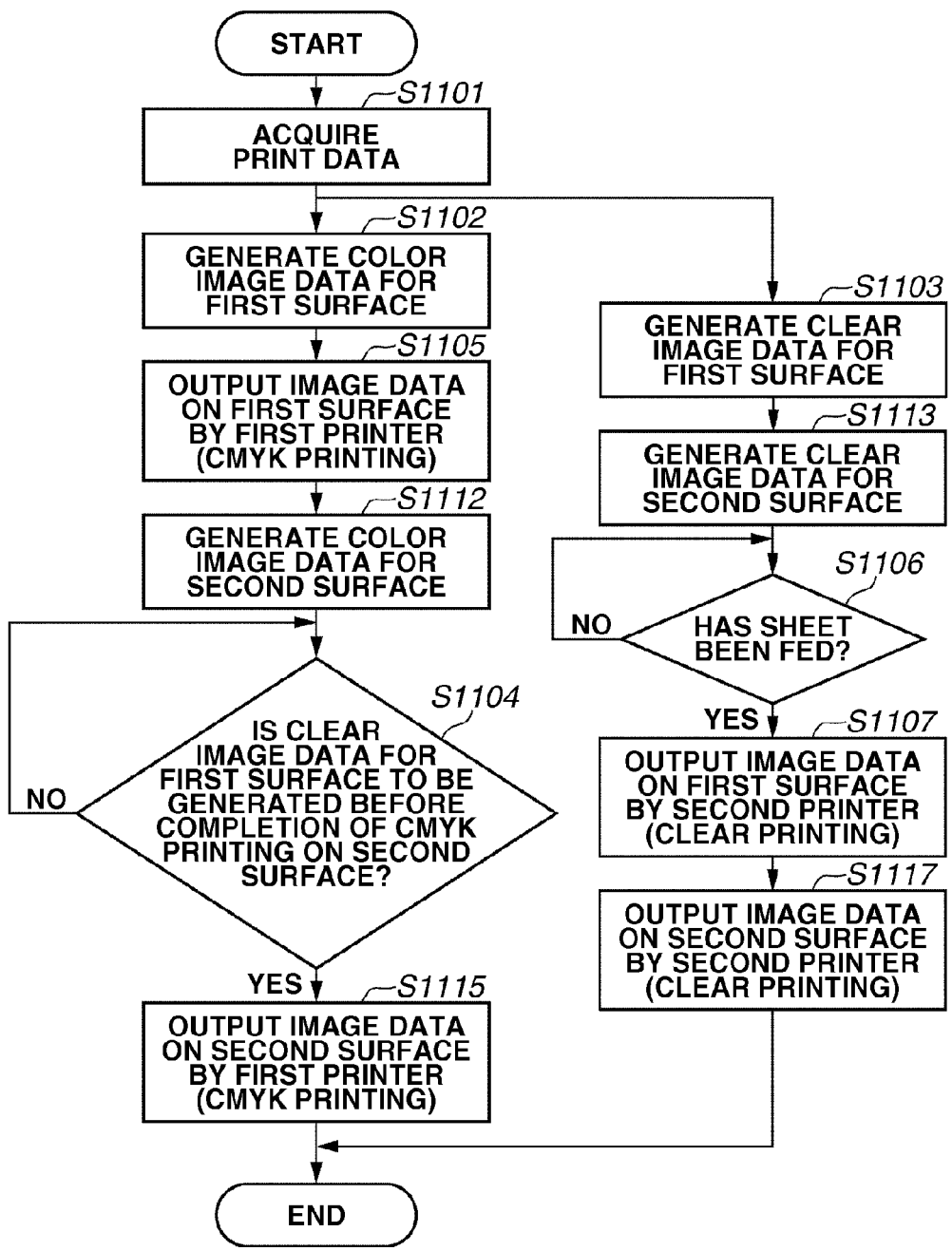

PRINTING SYSTEM, PRINTING APPARATUS, PRINTING METHOD, AND PROGRAM FOR IMPLEMENTING THE PRINTING SYSTEM AND THE PRINTING METHOD

BACKGROUND OF THE INVENTION

1. Field of the Invention

The present invention relates to a printing system, a printing apparatus, and a printing method configured to form an image on one sheet using a first toner and a second toner and by using a plurality of printing apparatuses and a program thereof.

2. Description of the Related Art

Recently, an electrophotographic apparatus that uses a clear toner, which is a special printing material, has been introduced. A clear toner is a transparent recording material which has a characteristic of adding a transparent image to images.

By using a clear toner like this, images can be expressed in various ways. Accordingly, additional values of a resulting output product may increase. A conventional electrophotographic apparatus is capable of generating an output product using a clear toner by using one electrophotographic apparatus including a mechanism or a method for adding a clear toner image to cyan, magenta, yellow, and black (CMYK) color toner images. However, in printing image data using a special printing material such as the clear toner, the conventional electrophotographic apparatus may consume more amount of toners for printing in total compared to conventional printing by four color toners.

In particular, if the above-described conventional recording apparatus is used in color printing, it is necessary to form a special printing material image on an intermediate transfer member on CMYK four color toner images that have been formed by the above-described conventional method, and transfer the images on a sheet. In other words, an amount of applied toner which is equivalent to an amount of toner necessary for printing for each electrophotographic process may increase. Accordingly, a large processing load may arise in each processing.

In order to solve the above-described problem, Japanese Patent Application Laid-Open No. 2007-011028 discusses a method for calculating the amount of applied recording material that can be recorded using a special printing material based on the amount of applied toner of CMYK four color toners.

However, if the amount of applied special printing material is calculated according to the method discussed in Japanese Patent Application Laid-Open No. 2007-011028, the resulting amount of applied special printing material may become "0" in some cases. More specifically, the amount of applied special printing material may become "0" if the total amount of applied toner of four color toners exceeds a total amount of toners that can be effectively fixed on a sheet and appropriately used on a printing apparatus. In this case, if a user has instructed printing that uses a special printing material, the printing that uses the special printing material instructed by the user cannot be executed. Accordingly, a visual effect produced by the special printing material on an output product may not be achieved.

In order to solve the above-described problem, a conventional method discussed in Japanese Patent Application Laid-Open No. 2008-139589, if it is determined that printing instructed by a user, which uses a special printing material, cannot be executed by one fixing operation, changes the method for forming a special printing material image. More specifically, the conventional method prints and fixes images using toners other than the special printing material and outputs a sheet having the fixed image. Further, the conventional method prints an image using the special printing material on the sheet having the printed toner images and fixes the image again. The printing method in which images are fixed twice is referred to as "2-pass printing".

By using the 2-pass printing method, an image can be printed using an amount of the special printing material more than a predetermined amount of the special printing material, which is previously determined based on the total amount of applied recording material that can be used on a printing apparatus. Therefore, in this case, printing that uses the special printing material instructed by a user can be executed. Accordingly, a visual effect of the special printing material on an output product intended by the user can be achieved.

By introducing a method that uses a clear toner, a problem, such as restriction of the toner amount, can be solved. However, if a user of the printing apparatus who does not use the clear toner, the method compliant with a job using the clear toner may require unnecessary functions and adversely increase costs of manufacture of the apparatus.

In order to solve this problem, the following system may be useful. In this system, a printing apparatus that uses a color toner and another printing apparatus that uses a special printing material are provided separately from each other. Further, a paper discharge unit of a first printing apparatus which uses the color toner and a paper feed unit of a second printing apparatus which uses the special printing material, are connected to each other. Accordingly, an output product using the special printing material can be completely generated under central control of the system. For a user who desires to execute printing using the special printing material, the system allows the user to use both the printing apparatus that uses the color toner and the other printing apparatus that uses the special printing material. On the other hand, for another user who does not desire to execute a print job that uses the special printing material, the system allows the user to use the printing apparatus that uses the color toner only. By using the method in which two printing apparatuses having different functions are connected to each other, the system can print a job as desired by the user.

However, in the system including the first and the second printing apparatuses connected with each other, if a timing of end of generation of image data within the second printing apparatus becomes later than a timing of discharge of a sheet having image data printed thereon from the first printing apparatus, a phenomenon of overrun may occur. "Overrun" is a state when image data is printed, the timing of end of generation of image data becomes later than the printing start time, and the printing may be started using image data incompletely generated. To paraphrase this, the overrun refers to an operation failure in which the image data to be printed is not completely generated before starting printing. If an overrun occurs, the paper may be jammed or a print failure in which the image data is not printed in the middle of a sheet may arise.

If it takes a long time in generating or transferring data necessary for printing that uses a clear toner which is executed by the second printing apparatus (hereinafter simply referred to as "clear image data"), printing may not be executed at the appropriate timing in synchronization with the conveyance to the second printing apparatus of the sheet having an image of data generated and printed by the first printing apparatus.

In this case, if the first printing apparatus further prints an image on a next sheet using a color toner and feeds the next sheet to the second printing apparatus when the second printing apparatus cannot perform printing, the paper jam may occur.

If the sheet having color images printed thereon is conveyed to the second printing apparatus before clear image data is completely generated by the second printing apparatus and if the printing is started in order to prevent paper jam, the overrun may occur. In this case, the sheet may be discharged without printing the clear image data thereon, or, even if the clear image data is printed on the sheet, the clear image data may be printed at an inappropriate printing position or on a wrong page.

SUMMARY OF THE INVENTION

According to an aspect of the present invention, a printing apparatus includes a generation unit configured to generate first print data and second print data based on input print data, a printing unit configured to generate first image data by executing image processing on the first print data generated by the generation unit and to print the generated first image data on a sheet, a transmission unit configured to transmit the second print data generated by the generation unit to another printing apparatus connected to the printing apparatus, and a conveyance unit configured, in order to print the second print data transmitted by the transmission unit, to convey the sheet having the first image data printed thereon by the printing unit to the another printing apparatus.

According to an aspect of the present invention, one image can be generated using a plurality of printing apparatuses. In addition, if time required for generating image data on a printing apparatus of a later stage may become longer than time required for printing by an earlier-stage printing apparatus, no overrun of sheet may occur.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 is a flow chart illustrating an exemplary flow of a print operation executed by a third exemplary embodiment of the present invention.

FIGS. 7A and 7B illustrate an example of image data.

FIG. 8 is a matrix for estimating time required for color printing.

FIG. 9 is a flow chart illustrating an exemplary flow of a print operation executed by a fourth exemplary embodiment of the present invention.

DESCRIPTION OF THE EMBODIMENTS

Various exemplary embodiments, features, and aspects of the invention will be described in detail below with reference to the drawings.

In each of the following exemplary embodiments of the present invention, a clear toner is used as a special printing material. However, a different other recording material or toner can be used as the special printing material according to each exemplary embodiment. More specifically, a light color toner or a special color toner such as red or green toner can be used in addition to the clear toner. Alternatively, a different other transparent recording material such as a transparent ink can be used.

The "clear toner" refers to a transparent recording material having a characteristic of adding a transparent image. A region of an image printed by the clear toner only is less visible than the other regions. By using the clear toner, an image can be printed with glossiness or glaze higher than that of images printed by color toners only.

In the following description, a multifunction peripheral (MFP) is used as a printing apparatus according to each exemplary embodiment. An MFP has a plurality of functions, such as a copy function, a printer function, and a facsimile transmission function. However, the present invention is not limited to the MFP. An apparatus capable of printing and outputting input image data can be used as the printing apparatus according to each exemplary embodiment of the present invention.

A first exemplary embodiment of the present invention will now be described below. If printing is executed on the same sheet using a first printing apparatus which executes printing by a first color material, and a second printing apparatus which executes printing by a second color material, the present exemplary embodiment can effectively suppress an overrun that may occur on the second printing apparatus as one of exemplary methods.

Figure 1:
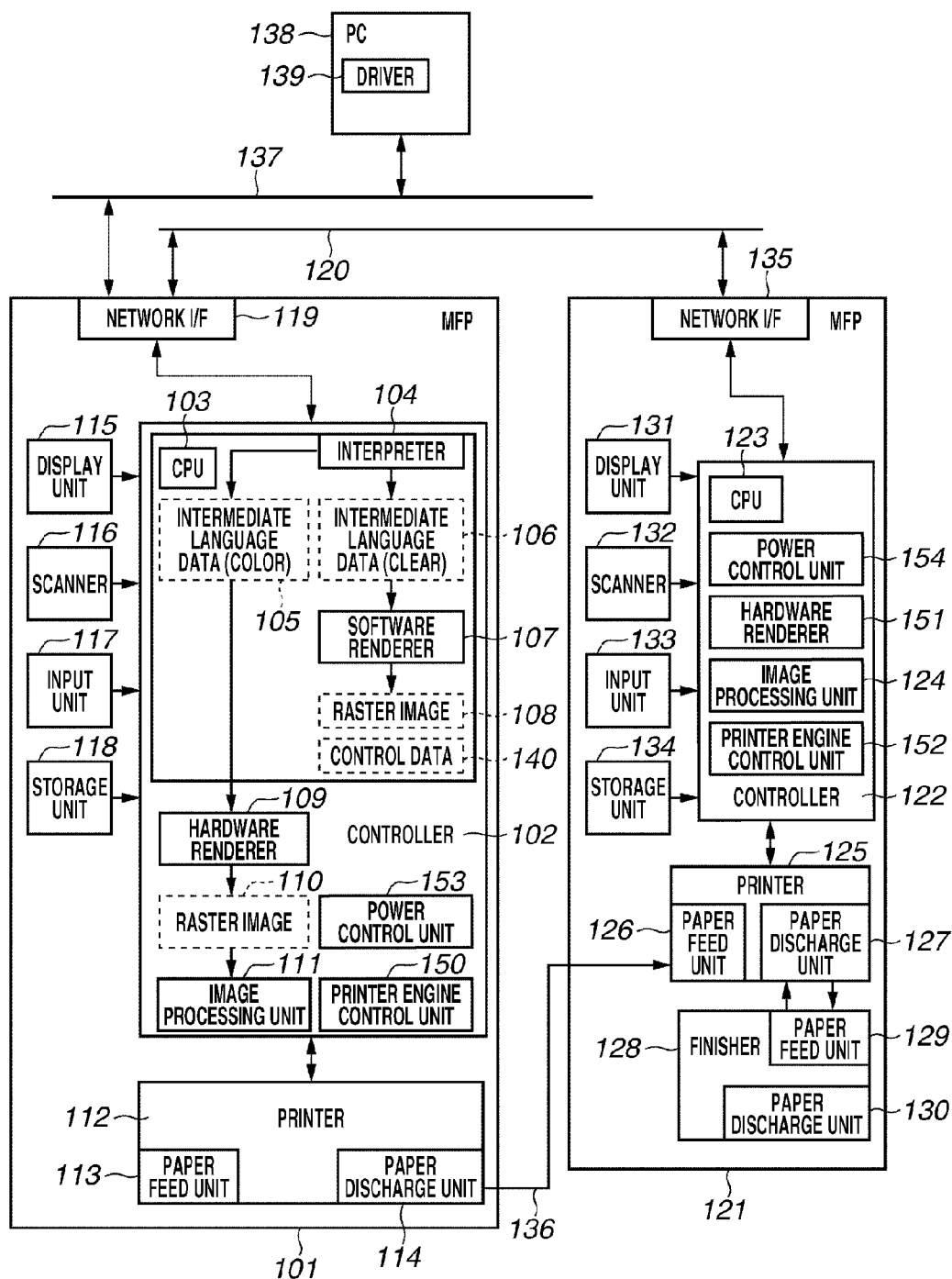
FIG. 1 is block diagram illustrating an example of a printing system.

FIG. 1 illustrates an example of a system according to the present exemplary embodiment. Referring to FIG. 1, an MFP 101 which implements a first printing apparatus, and an MFP 121 which implements a second printing apparatus are connected with each other via a network 120. The MFP 101, hereinafter referred to as the first MFP 101, uses a first color material. More specifically, the first MFP 101 executes printing using a color toner. The color material used by the first MFP 101 is not limited to a color toner, and a monochromatic toner can be used. Similarly, the MFP 121, hereinafter referred to as the second MFP 121, uses a second color material. More specifically, the second MFP 121 executes printing using a clear toner as a special printing material. The color material used by the second MFP 121 is not limited to the clear toner, and any other special color toners can be used.

A paper discharge unit 114 of the first MFP 101 is connected to a paper feed unit 126 of the second MFP 121 via a connector 136. Accordingly, a sheet discharged from the first MFP 101 can be automatically fed to the second MFP 121.

If sheets after completing the printing by the first MFP 101 are serially stacked on the connector 136, in feeding a plurality of the sheets stacked on the connector 136, it becomes necessary for the second MFP 121 to feed the sheet one by one from the bottom of the stacked sheets. In this case, the sheet may not be easily correctly fed. Further, there may be a threat of paper jamming or printing pages would be in disorder.

Accordingly, the connector 136 controls paper discharge and feed timings in the manner described below. After printing by a printer 112 of the first MFP 101 is completed, a sheet printed using the color toner is discharged to the paper discharge unit 114. The sheet is then conveyed to the connector 136 as it is. Then, before another sheet having an image newly printed thereon by the printer 112 of the first MFP 101 is discharged to the paper discharge unit 114, the second MFP 121 feeds the sheet stacked on the connector 136 to the paper feed unit 126. Accordingly, the sheet is not stacked on the connector 136 in plurality. The sheet is conveyed from the first MFP 101 to the second MFP 121 in the above-described manner.

A personal computer (PC) 138 is connected with the first MFP 101 via a network 137. A driver 139 of the PC 138 recognizes the first MFP 101 and the second MFP 121 as constituting one printing system that uses the color toners and the clear toner. Accordingly, the driver 139 transmits print data to the first MFP 101 and the second MFP 121. The print data includes data necessary for generating intermediate language data and data describing contents of post-processing (finishing processing, and the like) to be executed on a printed product after printing the intermediate language data. The intermediate language data will be described in detail below.

In the system illustrated in FIG. 1, a user can instruct printing that uses a color toner and printing that uses a clear toner by a single instruction.

Clear image data to be printed by the second MFP 121 can be printed on the entire surface of the sheet. Further, during print processing or copy processing, the user can designate specific color data to execute printing that uses the clear toner only for a designated region. Alternatively, the user can instruct printing that uses the clear toner for a part of a specific object.

Now, the first MFP 101 which uses the color toner will be described in detail below. A network interface (I/F) 119 receives print data and transmits a raster image and control data, which will be described in detail below. A controller 102 includes a central processing unit (CPU) 103, a renderer 109, and an image processing unit 111. The CPU 103 controls software processing by an interpreter 104 and a software renderer 107. The interpreter 104 of the CPU 103 interprets a page description language (PDL) portion of the received print data and generates intermediate language data (color) 105. The renderer 109 generates a raster image (color) 110 based on the generated intermediate language data (color) 105. The image processing unit 111 executes image processing on the raster image (color) 110 and on image data read by a scanner 116. In the present exemplary embodiment, image-processed image data is referred to as "color image data".

The printer 112 is connected with the controller 102 forms an image on a fed sheet based on output data using color toners, such as cyan (C), magenta (M), yellow (Y), and black (K) toners. The printer 112 includes a paper feed unit 113 for feeding a sheet used in printing and the paper discharge unit 114 which discharges a sheet having an image of color image data formed thereon. A display unit 115 displays a user interface (UI) that displays a message to a user and a status of the first MFP 101.

The scanner 116 includes an auto document feeder (ADF). The scanner 116 irradiates an image of one or more documents with a light source (not illustrated). In addition, the scanner 116 forms an image of light reflected on the document on a solid-state image sensor and acquires a signal read as a raster image from the solid-state image sensor as image data. An input unit 117 is an interface for receiving an input by the user. A storage unit 118 stores data processed by the controller 102.

If print data includes an instruction for printing the print data using the clear toner, the interpreter 104 generates intermediate language data (clear) 106 which is second print data in addition to the intermediate language data (color) 105. As an example of the data format of the intermediate language data, a "name-added profile", which is used for instructing printing that uses the clear toner for a designated specific region of image data to be printed, is used.

Processing that uses the data format will be described in detail below. When the user uses an application to associate a specific character string with a specific input color, then a name-added profile corresponding to the character string is selected. Therefore, if the user associates a specific character string with the clear toner using the driver 139 of the PC 138, then the corresponding name-added profile is selected, and then the user can select and instruct the clear toner for a region of the image desired to be printed using the clear toner. The interpreter 104 generates the intermediate language data (clear) 106 by extracting only the region of the image whose printing using the clear toner has been designated and generating a layer. The software renderer 107 converts the intermediate language data (clear) 106 into a raster image (clear) 108. The first MFP 101 transmits the raster image (clear) 108, which has been generated in the above-described manner, to the second MFP 121 via the network 120.

In the present exemplary embodiment, the name-added profile is used as the method for instructing a region of an image to be printed using the clear toner. However, the present exemplary embodiment is not limited to this, and any other methods capable of generating a raster image (clear) 108, which is instructed to be printed using the clear toner can be used. In addition, the first MFP 101 transmits control data 140 to the second MFP 121 via the network 120. The control data 140 refers to pieces of information, such as the number of sheets, a paper size, a type of a medium, and a setting for the finisher which are set by the user via the driver 139.

Now, the second MFP 121, which uses the clear toner, will be described in detail below. A network I/F 135 is connected with the network I/F 119 via the network 120. Data communication between the first MFP 101 and the second MFP 121 can be executed via the network I/F 135. A controller 122 includes a CPU 123 and an image processing unit 124. A printer 125 is connected with the controller 122 and prints an image on a sheet using the clear toner. The printer 125 includes the paper feed unit 126 which feeds a sheet, and a paper discharge unit 127 which discharges a sheet having output data formed thereon.

The paper feed unit 126 is connected with the paper discharge unit 114 of the first MFP 101 via the connector 136, and automatically feeds the sheet discharged from the first MFP 101 to the printer 125 using the feeding method as described above. A finisher 128 has various functions, such as a sorting function and a stapling function. The paper discharge unit 127 of the printer 125 is connected with a paper feed unit 129 of the finisher 128. After executing the processing designated by the user, such as sorting or stapling, the post-processed sheet is output by a paper discharge unit 130. A display unit 131, a scanner 132, an input unit 133, and a storage unit 134 are similar to the display unit 115, the scanner 116, the input unit 117, and the storage unit 118 of the first MFP 101, respectively. Accordingly, the detailed description thereof will not be repeated here.

The second MFP 121 receives the raster image (clear) 108 and the control data 140 which has been associated with the intermediate language data (color) 105 from the first MFP 101. Accordingly, color image data and clear image data to be printed on the same sheet can be associated. Further, the image processing unit 124 processes the raster image (clear) 108. The printer 125 and the finisher 128 are controlled based on the control data 140.

In the above-described processing on data, the raster data (clear) is transmitted from the controller of the first MFP 101 to the controller of the second MFP 121 because the intermediate language data has been rendered within the first MFP 101. However, if the controller of the second MFP 121 includes a renderer for rendering a clear toner image, the first MFP 101 can transmit the intermediate language data (clear) to the second MFP 121 and the second MFP 121 can generate raster data (clear). In this case, the first MFP 101 does not execute rendering of the intermediate language data (clear).

If both color data and clear data are rendered within the first MFP 101, first print data is raster data (color) and second print data is raster data (clear). In addition, first image data is data generated based on image-processed raster data (color). Second image data is data generated based on image-processed raster data (clear).

On the other hand, if clear data is rendered within the second MFP 121, first print data is intermediate language data (color) and second print data is intermediate language data (clear). In addition, first image data is raster data (color) and second image data is raster data (clear).

In the following description, it is supposed that clear data is rendered within the first MFP 101. Accordingly, the first print data is raster data (color) and the second print data is raster data (clear).

Now, an exemplary flow of print processing executed from the PC 138 via the driver 139 in the system according to the present exemplary embodiment of the present invention will be described in detail below with reference to FIG. 2.

A program for processing in steps S201 through S213 is stored in the storage unit 118 of the first MFP 101 and is loaded and executed by the CPU 103 on a random access memory (RAM) (not illustrated). A program for processing in steps S214 through S218 is stored in the storage unit 134 of the second MFP 121 and is loaded and executed by the CPU 123 on a RAM (not illustrated).

Figure 2:
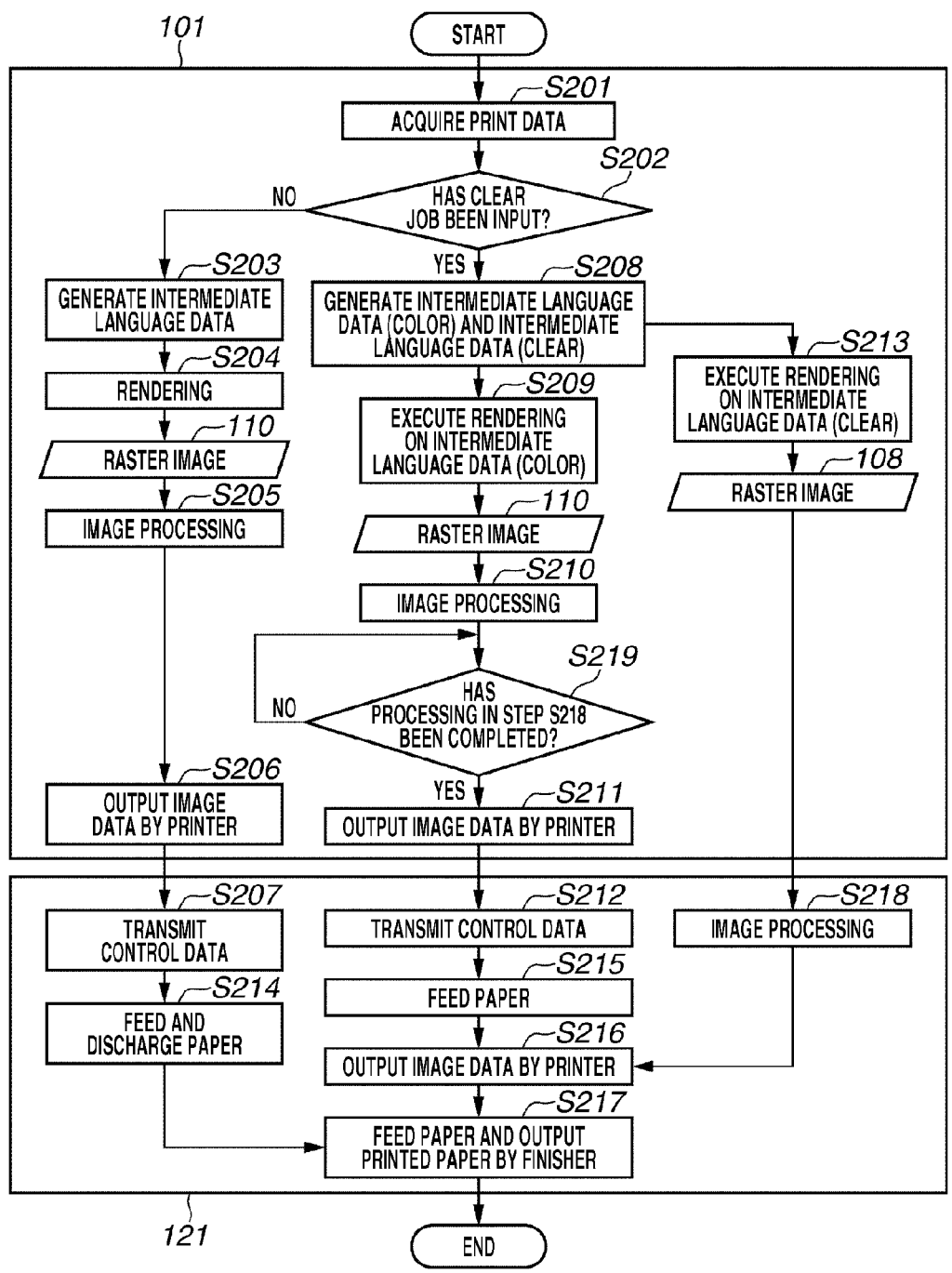
FIG. 2 is a flow chart illustrating an exemplary flow of a print operation executed by a first exemplary embodiment of the present invention.

Referring to FIG. 2, in step S201, the controller 102 acquires print data transmitted from the PC 138. As described above, in transmitting the print data, the PC 138 associates a portion of the print data to be printed using the clear toner with the name-added profile. Accordingly, the user can instruct printing using the clear toner of a specific color or a specific object. In step S202, the CPU 103 refers to the name-added profile included in the print data and determines whether the data has been instructed to be printed using the clear toner (hereinafter a job like this will be referred to as a "clear job").

If it is determined that the input job is not a clear job (No in step S202), then the processing advances to step S203. In step S203, the interpreter 104 generates the intermediate language data (color) 105. In step S204, the hardware renderer 109 executes the rendering and generates the raster image (color) 110. In step S205, the image processing unit 111 executes image processing on the raster image (color) 110.

In step S206, the printer 112 outputs the image data on the sheet using the CMYK color toners. In step S207, the CPU 103 transmits the control data 140 to the controller 122 of the second MFP 121 via the network I/F 119. In step S214, the second MFP 121 refers to the control data 140 and executes paper feeding and discharge processing.

In the present exemplary embodiment, the print data has been determined not to be a clear job in step S202. Accordingly, the clear toner is not used. In step S217, the finisher 128 feeds and outputs the sheet based on the control data 140. If the post-processing such as sorting has been designated by the control data 140, the finisher 128 executes the post-processing according to the designation.

On the other hand, if it is determined that a clear job which includes an instruction for executing printing using the clear toner is included in the input print data (Yes in step S202), then the processing advances to step S208. In step S208, the interpreter 104 generates the intermediate language data (color) 105 and the intermediate language data (clear) 106.

In step S209, the hardware renderer 109 generates the raster image (color) 110, which is the first print data, by rendering the intermediate language data (color) 105. In step S210, the raster image (color) 110 is subjected to image processing to generate color image data.

Before advancing to step S211, the processing advances to step S219. In step S219, the CPU 103 acquires information about whether the second MFP 121 has executed image processing on the raster image (clear) 108 which is the second print data, and clear image data which is the second image data has been completely generated.

This is because the time required for completing the generation of the clear image data may become longer than the time required for printing the color image data.

The time required for completing the generation of the clear image data may become longer than the time required for printing the color image data primarily due to the following reason. To paraphrase this, the rendering of the intermediate language data (color) is executed by the hardware renderer 109 while the rendering of the intermediate language data (clear) is executed by the software renderer 107. Accordingly, the rendering of the intermediate language data (clear) may usually take processing time longer than the processing time required for rendering of the intermediate language data (color).

In the present exemplary embodiment, data communication between the first MFP 101 and the second MFP 121 is implemented via the network. Because a CPU exists on the network, it may take a long time in transferring data. Accordingly, it is necessary to acquire the information about whether the generation of the clear image data has been completed before printing the color image data.

For a method for acquiring the above-described information, the controller 102 of the first MF 101 can inquire the controller 122 of the second MFP 121 about the status of progress of the generation of clear image data. Alternatively, the controller 122 of the second MFP 121 can notify the controller 102 of the first MFP 101 that the clear image data has been completely generated. Further alternatively, the controller 122 of the second MFP 121 can notify the controller 102 of the first MFP 101 of estimated time for completely generating the clear image data.

If it is determined that the generation of the clear image data has been completed (Yes in step S219), then the processing advances to step S211. In step S211, the printer 112 prints the color image data on the sheet using the CMYK color toners. In step S212, the CPU 103 transmits the control data 140 to the controller 122 of the second MFP 121 via the network I/F 119. In step S213, the software renderer 107 renders the intermediate language data (clear) 106 and generates the raster image (clear) 108. In addition, the software renderer 107 transmits the generated raster image (clear) 108 to the second MFP 121. In step S215, the second MFP 121 refers to the control data 140 and feeds the sheets which have the color toner images printed thereon and have been discharged via the connector 136.

In step S218, the image processing unit 124 executes image processing on the raster image (clear) 108 and generates clear image data. The image processing executed by the image processing unit 124 in step S218 is image processing necessary for generating the raster image (clear) 108 for data compliant with performance of an engine that prints the clear toner image. For example, the image processing executed by the image processing unit 124 in step S218 includes screening processing.

In step S216, the printer 125 prints the clear image data on the fed sheet using the clear toner. In step S217, the finisher 128 feeds the sheet and prints the data thereon according to the control data 140. As described above, by using the first MFP 101 and the second MFP 121 operating in the above-described manner, the present exemplary embodiment enables the printing of the image using the CMYK color toner and the image using the clear toner on the same sheet by one instruction input via the driver 139.

If the intermediate language data (clear) is transmitted to the second MFP 121, the processing in step S213 is executed by the controller 122 of the second MFP 121.

The second page and thereafter are processed if input data has become ready and if each processing target data can be appropriately processed in each of the above-described processing. More specifically, if the hardware renderer 109 illustrated in FIG. 1 can execute processing of a next page, the hardware renderer 109 executes the processing of the next page. To paraphrase this, if input data from the interpreter 104 (the intermediate language data (color) 105) has been prepared and if an arithmetic circuit (not illustrated) in the hardware renderer 109 and a memory (not illustrated) have a free capacity, it is determined that the next page can be processed. By executing processing on each page in parallel, a processing speed of the entire system can be increased.

In the present exemplary embodiment, each processing is executed in parallel to each other in the unit of a page. However, this description is made merely for easier understanding. It is not always necessary to execute each processing in the unit of a page. For example, each processing can be executed in parallel to each other in the unit of a band, which is a unit set by dividing a page into several units. Further, each processing can be executed in the unit of a job, which includes processing of a plurality of pages. Furthermore, the unit of processing does not need to be unified within the system. In other words, each component of the system can execute processing in an arbitrary useful unit. For example, the network I/F can receive one piece of print data in a lump while the interpreter 104 generates the intermediate language data 105 and 106 in the unit of a page, and the renderers 107, 109, and 151 can generate the raster image 108 in the unit of a band.

As described above, in the present exemplary embodiment, each processing component of the first MFP 101 and the second MFP 121 executes each processing in parallel to one another. In addition, the printer 112 executes printing using the color toner after it is determined that the image processing for the printing using the clear toner has been completed. Accordingly, the present exemplary embodiment can prevent an overrun from occurring.

Figure 4:
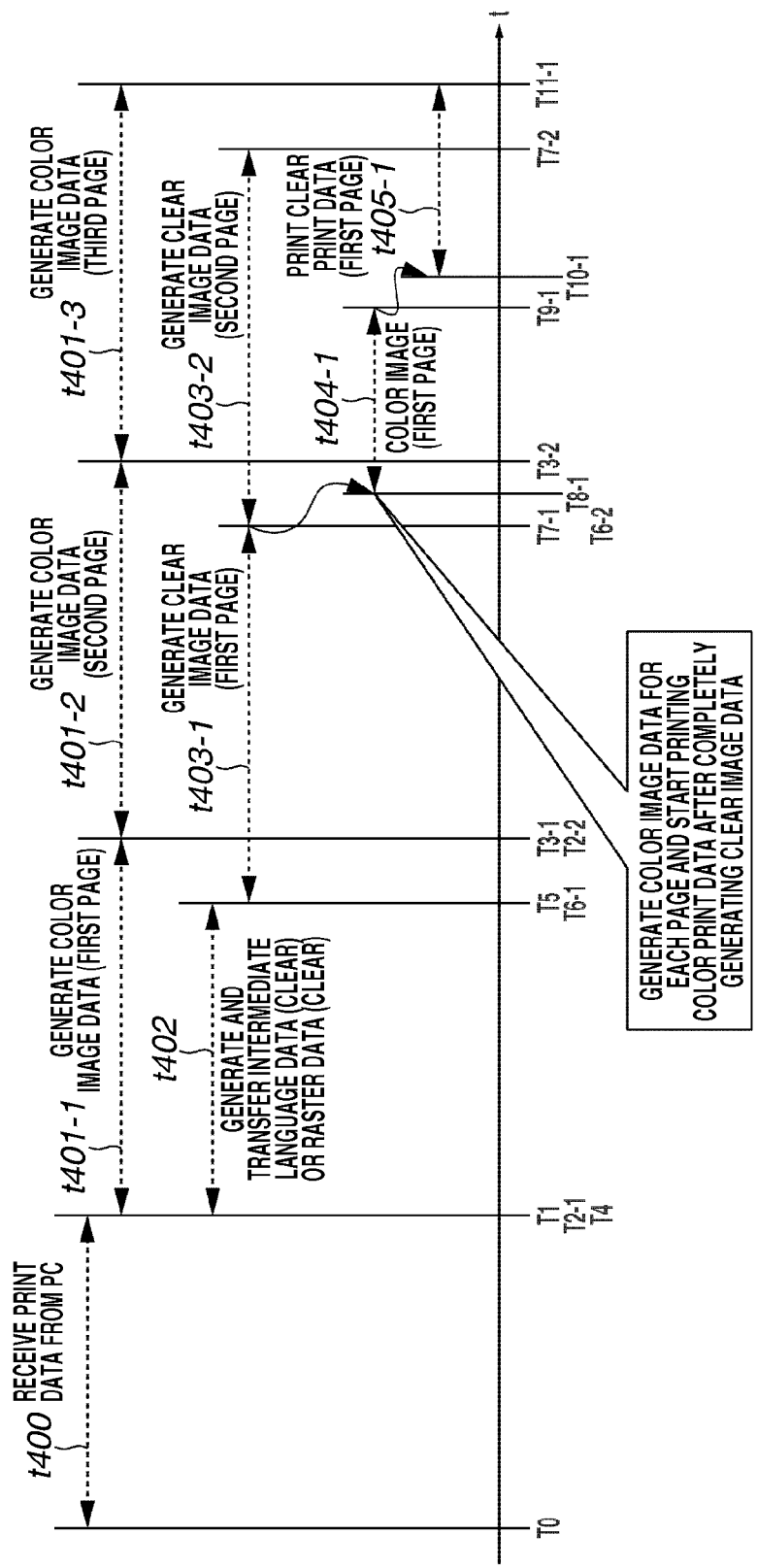
FIG. 4 is a timing chart illustrating an exemplary flow of a print operation executed by the first exemplary embodiment of the present invention.

Now, an example of a print operation according to the present exemplary embodiment which has the configuration illustrated in FIG. 1 will be described in detail below with reference to a timing chart in FIG. 4. FIG. 4 is the timing chart illustrating an exemplary flow of the print operation executed by the present exemplary embodiment. Referring to FIG. 4, during a time period t400 (from T0 to T1), the network I/F 119 receives the print data from the PC 138.

During a time period t401-1 (from T2-1 to T3-1), the first controller 102 generates color image data for a first page based on the print data received in the time period t400. Similarly, during a time period t401-2 (from T2-2 to T3-2), the first controller 102 generates color image data for a second page based on the print data received in the time period t400. Further, during a time period t401-3 (from T2-3 to T3-3), the first controller 102 generates color image data for a third page based on the print data received in the time period t400.

After having generated the color image data of the first page in the time period t401-1, in the time period t401-2, the first controller 102 generates the color image data of the second page. Then in the time period t401-3, the first controller 102 generates the color image data of the third page. Thereafter, the first controller 102 repeatedly generates color image data for the number of times equivalent to the number of pages of the print data in the similar manner.

During a time period t402 (from T4 to T5), the first controller 102 generates the intermediate language data (clear) 106 and the raster image (clear) 108 based on the print data received in the time period t400. In addition, the first controller 102 transfers the generated intermediate language data 106 and raster image 108 to the network I/F 135 of the second MFP 121 via the network 120.

Alternatively, during the time period t402 (from T4 to T5), if the rendering of the intermediate language data (clear) 106 is executed by the second MFP 121, the first controller 102 generates the intermediate language data (clear) and transfers the generated intermediate language data (clear) to the network I/F 135 of the second MFP 121 via the network 120.

In the present exemplary embodiment, the print data of all the pages is transferred from the controller 102 of the first MFP 101 to the controller 122 of the second MFP 121 in a lump. However, the present exemplary embodiment is not limited to this. More specifically, the first controller 102 can transfer the generated data in the unit of a page or in the smaller divided unit of a band.

During a time period t403-1 (from T6-1 to T7-1), the second controller 122 generates clear image data of the first page based on the raster image (clear) 108 or the intermediate language data (clear) 106 received in the time period t402.

During a time period t403-2 (from T6-2 to T7-2), similarly, the controller 122 generates clear image data of the second page based on data received in the time period t400. After generating the clear image data of the first page in the time period t403-1, the controller 122 generates the clear image data of the second page in the time period t403-2. Thereafter, the controller 122 repeatedly generates clear image data for the number of times equivalent to the number of pages of the print data in the similar manner.

During a time period t404-1 (from T8-1 to T9-1), the first printer 112 prints the color image data of the first page which has been generated in the time period t401 using the color toner. The processing in the time period t404-1, as described above with reference to step S219 illustrated in FIG. 2, is started after it is determined that the clear image data has been completely generated to start the printing of the first page using the color toner.

During a time period t405-1 (from T10-1 to T11-1), the second printer 125 prints the clear print data of the first page which has been generated in the time period t403-1 using the clear toner. Thereafter, the printing of the color image data and the printing of the clear image data is repeated for the number of times equivalent to the number of pages included in the print data.

Although the printing of the second page and beyond is omitted in FIG. 4, the printing of the color image data and the printing of the clear image data is continuously executed for the number of times equivalent to the number of pages designated in the print data. A lapse exists between the timing of end of the time period t403-1 (the generation of the clear image data) and the start of the time period t404-1 (the printing of the color image data). During this lapse of time, the first MFP 101 determines whether the generation of the clear image data has been completed. The lapse can be set substantially as close as "0".

Another lapse exists between the timing of end of the time period t404-1 (the printing of the color image data) and the start of the time period t405-1 (the printing of the clear image data). During this lapse of time, the first MFP 101 transmits the sheet having the color image printed thereon to the second MFP 121.

As described above, if the system illustrated in FIG. 1 executes the print operation illustrated in FIG. 2, the system operates according to the timing chart illustrated in FIG. 4. In other words, the first controller 102 which has generated the color image data will execute control for starting the printing of the color image data after the controller 122 has completed the generation of the clear image data. Then, the controller 122 starts the printing of the clear image data. With the above-described configuration, the present exemplary embodiment can implement the printing system in which no overrun of the sheet may not occur in the printing using the clear toner.

The print processing executed in the system according to the present exemplary embodiment is described above with reference to FIG. 2. Now, copy processing executed in the system according to the present exemplary embodiment will be described in detail below with reference to a flow chart in FIG. 3.

Figure 3:
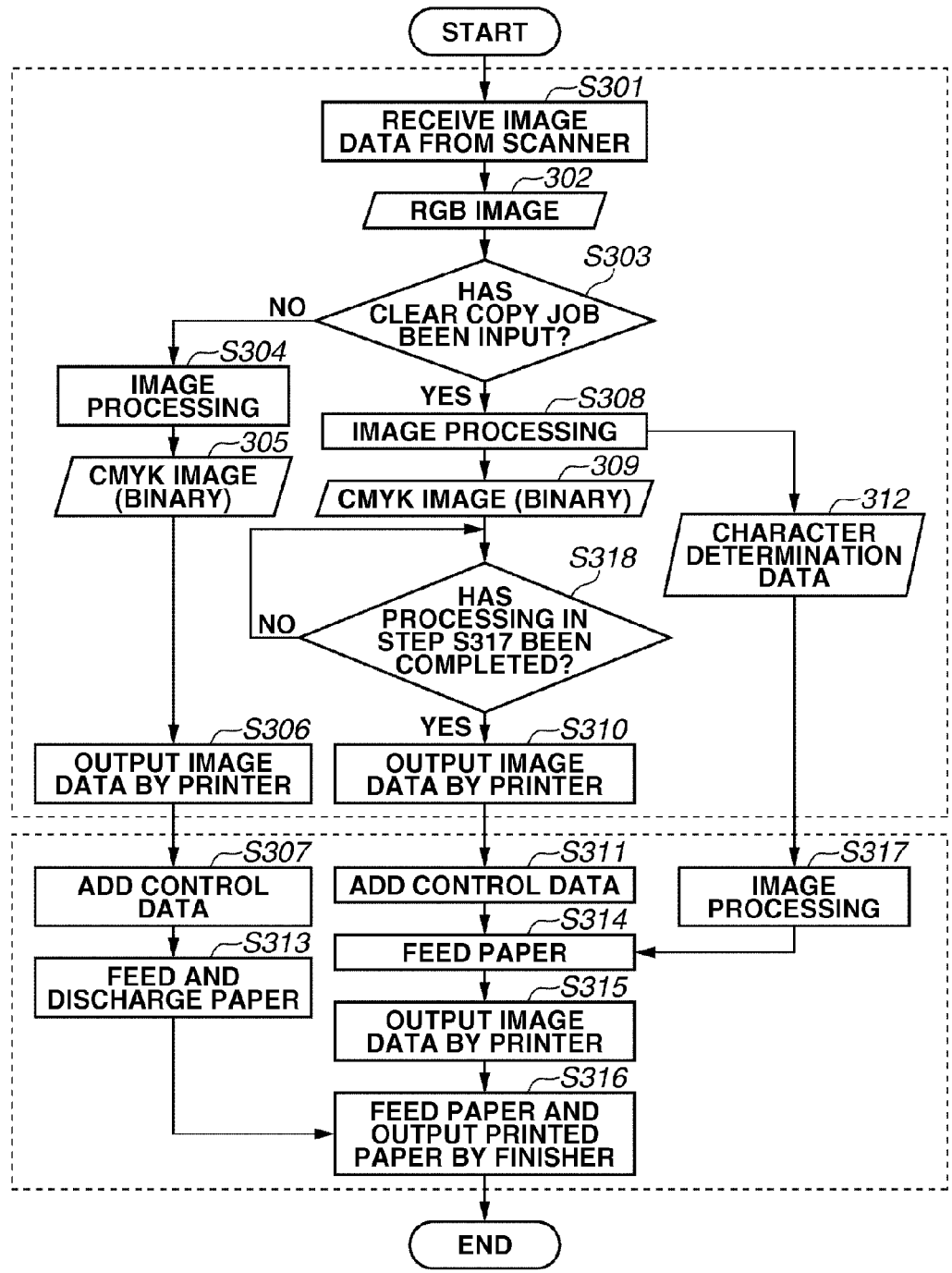
FIG. 3 is a flow chart illustrating an exemplary flow of a copy operation executed by the first exemplary embodiment of the present invention.

A program for processing in steps S301 through S312 is stored in the storage unit 118 of the first MFP 101 and is loaded and executed by the CPU 103 on a RAM (not illustrated). A program for processing in steps S313 through S317 is stored in the storage unit 134 of the second MFP 121 and is loaded and executed by the CPU 123 on a RAM (not illustrated). Referring to FIG. 3, in step S301, the controller 102 receives an image acquired by the scanner 116 and acquires a red (R), green (G), and blue (B) (RGB) image 302.

In addition, the first controller 102 displays a copy button for instructing whether to print a clear tone image on a specific object included in the image on the display unit 115 of the first MFP 101. In step S303, the first controller 102 determines whether the copy job instructed by the user is a clear copy job for additionally applying the clear toner on the image to be copied. If it is determined that the clear toner is not to be applied to the image data to be copied (No in step S302), then the processing advances to step S304. In step S304, the image processing unit 111 executes image processing, and a CMYK image (binary) 305 is printed.

On the other hand, if it is determined that the input copy job is a clear copy job (Yes in step S302), then the processing advances to step S308. In step S308, the image processing unit 111 executes image processing, and a CMYK image (binary) 309 is printed. In addition, data of a region whose printing using the clear toner has been instructed is generated during the image processing in step S308.

Suppose that a specific object existing in an original document to be copied only has been instructed to be printed using the clear toner as described above. In this case, if the specific object is a text, then the CPU 103 acquires character determination data 312 based on a result of a determination on a text portion of the document. For the determination on the text portion, a publicly known method can be used. Accordingly, the description thereof is omitted in the present exemplary embodiment. By using the text portion determination data, it is enabled to apply the clear toner only to the text portion of the document. In the present exemplary embodiment, the character determination data is used as an example of image data for applying the clear toner to a specific object. However, the present exemplary embodiment is not limited to this. More specifically, the clear toner can be applied to an object, for example, an object having a specific hue extracted from the image of the document.

The first MFP 101 transmits the character determination data 312 to the second MFP 121 as raster image data for printing using the clear toner. The processing in steps S306 and S307 is similar to that in steps S206 and S207 (FIG. 2), respectively. Accordingly, the description thereof will not be repeated here. Further, the processing in steps S310 and S311 is similar to that in steps S211 and S212 (FIG. 2), respectively. Accordingly, the description thereof will not be repeated either. Moreover, the processing in steps S313 through S317 is similar to that in steps S214 through S218 (FIG. 2), respectively. Accordingly, the description thereof will not be repeated either.

Similar to the scanning operation, in executing the copy operation, after it is determined that the generation of the clear image data in step S317 has been completed (Yes in step S318), the processing in step S310, i.e., the printing using the CMYK color toners, is executed. Accordingly, with the above-described configuration, no overrun may occur during the printing using the clear toner in step S315 in executing the copy operation either.

As described above, in the present exemplary embodiment, the first MFP 101 executes the printing using the color toner after it is determined that the generation of the clear image data which is generated by the second MFP 121 to be used in the printing using the clear toner has been completed. Thus, the present exemplary embodiment can prevent the overrun from occurring when the printing of the image data using the clear toner is executed by the second MFP 121.

Now, a second exemplary embodiment of the present invention will be described in detail below. In the present exemplary embodiment, a system including a plurality of MFPs has the same configuration as that of the system of the first exemplary embodiment described above with reference to FIG. 1. Accordingly, the detailed description thereof will not be repeated.

In the present exemplary embodiment, of clear image data and color image data included in the same page, the generation of the clear image data starts earlier than starting the generation of the color image data. In addition, after the generation of the clear image data is completed, the generation of the color image data included in the same page is started. Accordingly, the present exemplary embodiment can effectively prevent an overrun from occurring.

Figure 5:
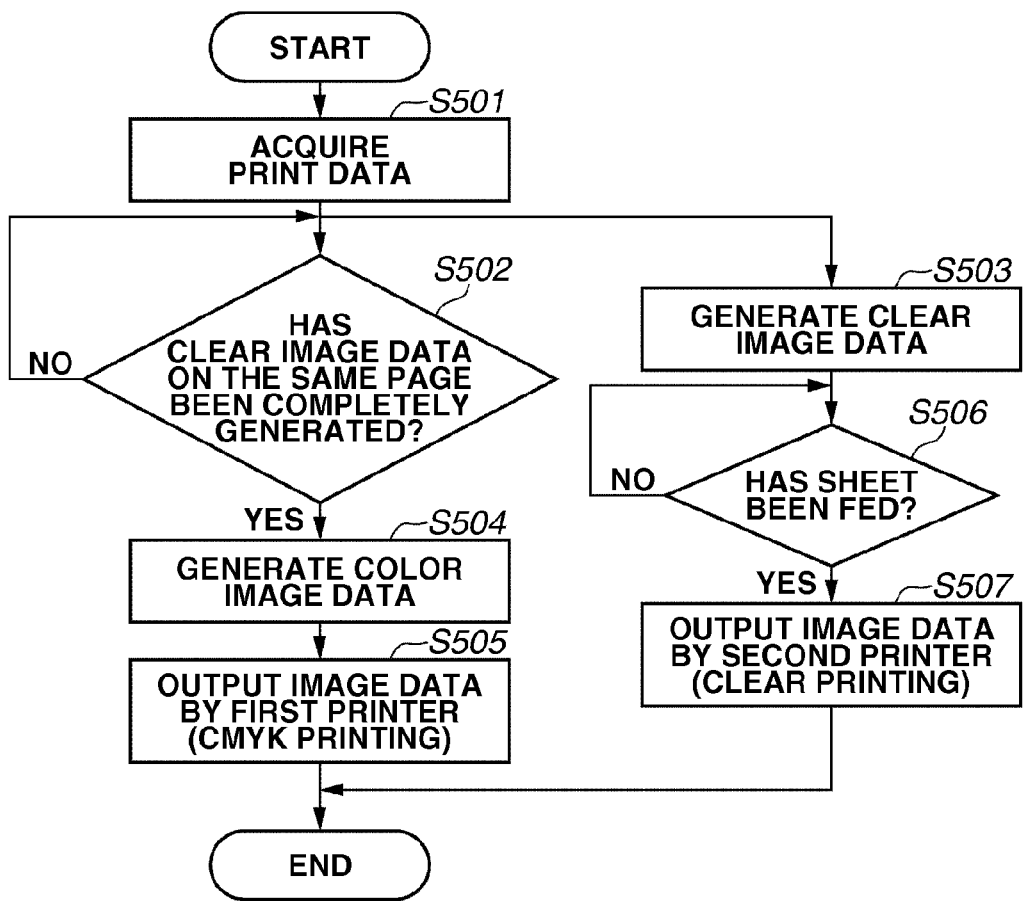
FIG. 5 is a flow chart illustrating an exemplary flow of a print operation executed by a second exemplary embodiment of the present invention.

A method according to the present exemplary embodiment will be described in detail below with reference to FIG. 5. FIG. 5 is a flow chart illustrating an example of a print operation executed by the PC 138 and the printing system according to the present exemplary embodiment which includes the first MFP 101 and the second MFP 121 illustrated in FIG. 1. Referring to FIG. 5, in step S501, the printing system including the first MFP 101 and the second MFP 121 receives print data from the PC 138. In step S502, the controller 102 of the first MFP 101 determines whether the generation of clear image data included in the same page as the page including the color image data to be generated has been completed.

If it is determined that the generation of the clear image data included in the same page as the page including the color image data to be generated has not been completed (No in step S502), then the processing return to step S502 and waits until the generation of the clear image data is completed. On the other hand, if it is determined that the generation of the clear image data has been completed (Yes in step S502), then the processing advances to step S504. In step S504, the first controller 102 generates the color image data to be used for the printing using the color toners. In step S505, the printer 112 of the first MFP 101 executes the printing using the color toners.

In parallel to the operation by the controller 102 of the first MFP 101, in step S503, the controller 122 of the second MFP 121 generates the clear image data to be used for the printing using the clear toner. In step S506, the controller 122 determines whether the sheet having been already processed by the first MFP 101 is fed. If it is determined that the sheet having been already processed by the first MFP 101 is not fed yet (No in step S506), then the second controller 122 repeats the processing in step S506 until the sheet is fed. During the time waiting for the sheet to be fed, the controller 122 can generate the clear image data of the next page. On the other hand, if it is determined that the sheet having already been processed by the first MFP 101 is fed (Yes in step S506), then the processing advances to step S507.

In step S507, the second printer 125 prints the clear image data using the clear toner.

In step S504, the first controller 102 generates the color image data of the first page. In step S505, the first controller 102 executes control for printing the color image data. After the printing of the color image data of the first page in step S505 is completed, the sheet having the color images printed thereon is discharged from the first MFP 101. After feeding the sheet to the second MFP 121, the processing advances from step S506 to step S507. In step S507, the second controller 122 executes control for printing the clear image data of the first page.

For the second page and beyond, the printing system according to the present exemplary embodiment repeats the above-described operations to print a plurality of pages. By executing the processing according to the flow chart in FIG. 5, the generation of clear image data of each page ends before the printing of the color image data of each page is completed. Accordingly, the overrun can be effectively prevented.

As described above, in the present exemplary embodiment, clear image data is generated before generating color image data. After it is determined that the generation of clear image data has been completed, the generation of the color image data is started. Therefore, immediately after generating the color image data, the printing of the color image data and the clear image data can be executed. Accordingly, the present exemplary embodiment can implement the printing apparatus capable of executing printing at a high printing speed.

Now, a third exemplary embodiment of the present invention will be described in detail below. In the present exemplary embodiment, a system including a plurality of MFPs has the same configuration as that of the system of the first exemplary embodiment described above with reference to FIG. 1. Accordingly, the detailed description thereof will not be repeated.

In the present exemplary embodiment, time required for generating clear image data and time required for printing color image data which are included in the same page are estimated, and an overrun can be prevented based on a result of estimation.

Primarily, the present exemplary embodiment compares a result of the estimation of the time required for generating the clear image data and a result of the estimation of the time required for printing the color image data. If, as a result of the comparison, it is determined that the time required for generating the clear image data is longer than the time required for printing the color image data, then the present exemplary embodiment sets standby time before starting the printing of the color image data. The processing according to the present exemplary embodiment will be described in detail below.

FIG. 6 is a flow chart illustrating an example of a print operation executed by the PC 138 and the printing system according to the present exemplary embodiment which includes the first MFP 101 and the second MFP 121 illustrated in FIG. 1. Processing illustrated in the flow chart of FIG. 6 is executed by the first controller 102 and the second controller 122 illustrated in FIG. 1.

In step S701 in FIG. 6, the printing system receives print data from the PC 138. After receiving the print data, in step S708, the first controller 102 calculates the time required for generating the clear image data included in the same page as the page including the color image data and the time required for printing the color image data by using an estimation method, which will be described in detail below.

If the calculated time for generating the clear image data is shorter than the calculated time required for printing the color image data, the first controller 102 immediately generates and prints the color image data.

On the other hand, if it is determined that the calculated time required for generating the clear image data is longer than the calculated time required for printing the color image data, then the processing advances to step S702. In step S702, the first controller 102 generates the color image data first.

In step S704, according to the estimated time for generating the clear image data, the first controller 102 delays the time of start of the printing of the color image data so that the clear image data can be generated before the end of the printing of the color image data. In step S705, the first printer 112 executes the printing using the color toners.

In parallel to the operation of the first controller 102, the second MFP 121, in step S709, calculates the time required for generating the clear image data based on the received print data. The first controller 102 can receive a result of the estimation of the time required for generating the clear image data from the second controller. Alternatively, as described above, in step S708, the first controller 102 can estimate both the time required for generating the clear image data and the time required for printing the color image data. In this case, the processing in step S709 is omitted.

The method for executing the estimation will be described in detail below. In step S703, the second controller 122 generates the clear image data for the printing using the clear toner. In step S706, the second controller 122 waits until the sheet having already been processed by the first MFP 101 is fed. During the time waiting for the sheet to be fed, the controller 122 can generate the clear image data of the next page. If it is determined that the sheet having already been processed by the first MFP 101 has been fed (Yes in step S706), then the processing advances to step S707.

In step S707, the second printer 125 prints the clear image data using the clear toner.

As described above, the present exemplary embodiment estimates the time required for generating the clear image data for each page and executes control so that the printing of the color image data can be completed before the estimated time comes. Accordingly, in the present exemplary embodiment, an overrun can be effectively prevented from occurring because the generation of clear image data of each page is completed before the printing of the color image data of each page ends.

By repeatedly executing the above-described operation, a plurality of pages can be printed.

Now, a method for estimating the time required for generating the clear image data will be described in detail below.

Two methods can be used as the estimation method according to the present exemplary embodiment. In a first method, the present exemplary embodiment calculates the time required for generating a raster image (clear) at the timing at which the intermediate language data (clear) is generated. In a second method, at the timing at which the print data is a raster image (clear), the present exemplary embodiment calculates the time required for generating the clear image data by executing image processing on the raster image (clear). Either one of the above-described two methods can be used.

For easier understanding, suppose that the controller 102 of the first MFP 101 executes the rendering. In this case, if the first controller 102 calculates the time required for generating the clear image data in step S708 in FIG. 6, the first controller 102 executes the first method for estimating the time required for generating the clear image data which is executed at the timing at which the intermediate language data (clear) is generated. If the estimation is executed in step S709, the second estimation method, which is executed at the timing at which the raster image (clear) is generated, is executed.

At first, the estimation method executed at the timing at which the print data is intermediate language data will be described in detail below with reference to FIGS. 7A and 7B. FIGS. 7A and 7B illustrate an example of the image data according to the present exemplary embodiment. More specifically, FIG. 7A illustrates an example of a color image including three objects. Referring to FIG. 7A, the entire color image 901 includes a first object image 911, a second object image 912, and a third object image 913. FIG. 7B illustrates a clear image including three objects. Referring to FIG. 7B, the entire image 902 includes a first object image 921, a second object image 922, and a third object image 923. In printing the images on a sheet, images of the objects illustrated in FIG. 7A are printed using the color toner while images of the objects illustrated in FIG. 7B are printed using the clear toner. The objects 911 through 913 and 921 through 923 are printed on the same sheet in an overlapping state.

At first, the first estimation method, i.e., the estimation executed when the print data is intermediate language data will be described. In step S708 in FIG. 6, the first controller 102 calculates the time required for the processing using the following expression 1 when the clear image data 902 is intermediate language data. In the present exemplary embodiment, the processing executed when the clear image data 902 is the intermediate language data includes processing for generating each dot of image data from each object included in the intermediate language data. In the case of the clear image data 902 including three objects, the total processing time for processing the three objects is the estimated time. Accordingly, by using the following expression 1, the time of processing executed when the clear image data 902 is intermediate language data can be estimated by analyzing each object in detail and by calculating the amount to be calculated, such as the number of dots to be processed for each object.

[Expression 1]

$$\text{(calculated time for generating image to be printed)} = \sum_{i=1}^{n} \text{(time for processing an } i\text{-th object)} \quad (1)$$

where "n" denotes the total number of objects.

Alternatively, the time required for the processing executed when the clear image data 902 is intermediate language data can be estimated by multiplying average processing time for processing the objects, which has been previously calculated by using the following expression 2, which is different from the above-described expression 1.

[Expression 2]

$$\text{(calculated time for generating image to be printed)} = \text{(average processing time for processing objects)} \times \text{(number of objects)} \quad (2)$$

If the expression 1 is used, the accuracy of the estimation can be higher compared to the case where the expression 2 is used. On the other hand, if the expression 2 is used, a calculation amount for the estimation can be smaller than that in the case where the expression 1 is used.

Now, the second estimation method executed when the clear image data is raster image data, which is executed using the following expression 3, will be described in detail below.

The processing executed when the clear image data is raster image data includes processing for controlling an amount of applied toner (hereinafter referred to as "toner application amount control") on the raster image. More specifically, "toner application amount control" refers to processing for increasing the property for fixing the toners. For example, the toner application amount control includes processing for changing an amount of the clear toner to be applied according to whether a CMYK toner image has been drawn on a dot or not. In other words, the toner application amount control includes processing for increasing or decreasing the amount of toner to be applied in printing the clear image data based on whether a CMYK toner image has been drawn or not on each dot of CMYK image data. Therefore, the time taken for the calculation for the toner application amount control is not determined according to the type of the image data but is proportional to the number of the dots on the sheet for the entire image. The number of dots on the sheet is proportional to the paper size and the resolution.

[Expression 3]

$$\text{(calculated time for generating image to be printed)} = \text{(processing time for each dot)} \times \text{(number of dots on a sheet)} \quad (3)$$

In the present exemplary embodiment, the estimation executed when the clear image data is raster image data is uniformly executed for the entire image. However, the present exemplary embodiment is not limited to this. Similar to the estimation executed when the clear image data is intermediate language data, the image can be partially subjected to image processing according to the type of the image processing. In this case, the calculation can be executed based on the number of dots to be image-processed using a method which applies the expression 1. Alternatively, the processing time can be calculated simply based on average image processing time using a method which applies the expression 2.

For the above-described estimation, it is useful to calculate the time required for the processing with an optimum combination of the expressions described above according to the configuration of the controller. As described above, in the present exemplary embodiment, the estimation when the clear image data is intermediate language data is executed in step S708 in FIG. 6, and the estimation when the clear image data is raster image data is executed in step S709. However, the estimation in steps S708 and S709 can be executed by either the first controller 102 or the second controller 122.

In addition, the estimation executed when the clear image data is intermediate language data and the estimation executed when the clear image data is raster image data can be executed by the same controller. Further, if the processing for generating the raster image based on the intermediate language data and the processing for image-processing the raster image is serially executed, the estimated time can be calculated by adding the time required for generating the raster image based on the intermediate language data and the time required for image-processing the raster image.

Now, an example of the method for estimating the time required for printing the color image data will be described in detail below. The present exemplary embodiment executes the estimation using a matrix that stores a paper size previously designated in the print data and a paper feed accessory that stores the sheet. FIG. 8 illustrates an example of the matrix.

FIG. 8 is an example of the matrix used in calculating the time required for completely printing the color image data. For example, if an A3-size paper is fed from a lower stage of a paper feed accessory, it can be calculated that two seconds is required as the time for the color printing in step S705 by referring to the matrix illustrated in FIG. 8. The matrix is previously stored in a storage area (not illustrated) of the controller of the first MFP 101.

In printing the clear image data, the time required for printing the clear image data can be calculated using a matrix similar to the matrix illustrated in FIG. 8, which is the matrix used for calculating the time required for printing the color image data. The method for calculating the time required for printing the clear image data is similar to the method for calculating the time required for printing the color image data. Accordingly, the detailed description thereof will not be repeated.

The number of the matrix is not limited to one. More specifically, the time required for the above-described processing can be calculated and estimated using a plurality of matrices according to the type of the printing of a previous page, i.e., one-sided or two-sided printing, and color or monochromatic printing, where necessary.

It is useful to execute the estimation using the controller of the MFP that manages the paper feed accessory. However, the present exemplary embodiment is not limited to this, and the estimation can also be executed by the controller of the MFP that does not manage the paper feed accessory.

If the estimated time calculated by the above-described method fails, an overrun may occur. In order to prevent an overrun from occurring, if the result of the estimation may have an error, it is useful to set the estimated time longer by adding the possibly erroneous time to the calculation result.

As described above, in the present exemplary embodiment, the time required for generating the clear image data and the time required for printing the color image data are estimated. Accordingly, the present exemplary embodiment can prevent an overrun from occurring and implement printing at a high printing speed.

A fourth exemplary embodiment of the present invention will now be described in detail below. In the present exemplary embodiment, a system including a plurality of MFPs has the same configuration as that of the system of the first exemplary embodiment described above with reference to FIG. 1. Accordingly, the detailed description thereof will not be repeated.

In the following description, it is supposed that two-sided printing is executed. A surface of a sheet to be printed first is referred to as a "first surface". Another surface of the sheet to be printed next on which the clear image data is printed is referred to as a "second surface". In the following description, it is supposed that both the first printing apparatus and the second printing apparatus execute two-sided printing.

An example of the operation executed by the present embodiment will be described in detail below with reference to FIG. 9. FIG. 9 is a flow chart illustrating an example of a print operation executed by the PC 138 and the printing system according to the present exemplary embodiment which includes the first MFP 101 and the second MFP 121 illustrated in FIG. 1. Referring to FIG. 9, in step S1101, the printing system receives print data from the PC 138.

Processing in steps S1102 through S1115, which is executed under control of the first controller 102, will be described in detail. Each processing in the flowchart of FIG. 9 is controlled by a CPU (not illustrated) included in the first controller 102. In step S1102, the CPU generates color image data of the first surface to be printed by the first printer 112.

In step S1105, the first printer 112 executes the printing on the first surface using the color toners. In step S1112, the CPU executes control for generating color image data to be printed on the second surface, which is printed by the first printer 112. In step S1104, the first controller 102 determines whether the generation, by the second controller 122, of the clear image data to be printed on the first surface, which is printed by the second printer 125, is completed before the printing of each page which is executed using the color toners is completed.

If it is determined that the generation of the clear image data is not completed before the printing of the color image data (No in step S1104), then the processing in step S1104 is repeated until it is determined that the generation of the clear image data to be printed on the first surface is completed. For the determination in step S1104, similar to the first exemplary embodiment described above, the first controller 102 can inquire the second controller 122 of a status of the generation of the clear image data. Alternatively, the second controller 122 can notify the first controller 102 of completion of the generation of the clear image data.

Further alternatively, the second controller 122 can notify the first controller 102 of the time required for completely generating the clear image data, as described in the third exemplary embodiment. The first controller 102 can calculate the time required for completely generating and printing the color image data and execute determination based on the resulting estimated time.

As described above, the present exemplary embodiment executes the processing in step S1104 after step S1112 for easier understanding. However, the processing in step S1112 can be executed after step S1104. Alternatively, the processing in steps S1102 and S1112 can be executed in parallel to generate image data to be printed on the first and the second surfaces of the sheet in parallel.

In other words, any method can be used if it can be determined whether the generation of the clear image data required for printing the image data on the first surface using the clear toner is completed before completely printing the image data on the first and the second surfaces using the color toners.

In step S1105, the first printer 112 executes printing on the second surface using the color toners.

The processing in steps S1103 through S1117, which is executed in parallel to the above-described operation, will be described in detail below. Each processing illustrated in the flow chart in FIG. 9 is executed under control of a CPU (not illustrated) included in the second controller 122. In step S1103, the second controller 122 generates the clear image data to be printed on the first surface, which is printed by the second printer 125. In step S1113, the second controller 122 generates the clear image data to be printed on the second surface, which is printed by the second printer 125.

In step S1106, the second controller 122 determines whether the sheet having already been processed by the first MFP 101 is fed. If it is determined that the sheet is not fed yet (No in step S1106), then the second controller 122 repeats the processing in step S1106 until the sheet is fed. During the time waiting for the sheet to be fed, the controller 122 can generate the clear image data of the next page. On the other hand, if it is determined that the sheet having already been processed by the first MFP 101 is fed (Yes in step S1106) and when the printing by the first printer 112 is completed, then the processing advances to step S1107.

In step S1107, the second printer 125 executes the printing on the first surface using the clear toner. In step S1117, the second printer 125 executes the printing on the second surface using the clear toner. By repeatedly executing the above-described operation, a plurality of pages can be printed.

In the present exemplary embodiment, both the first MFP and the second MFP execute two-sided printing. However, the present exemplary embodiment is not limited to two-sided printing If the first and the second MFPs mixedly execute two-sided printing and one-sided printing, the present exemplary embodiment can implement the printing system that can effectively prevent an overrun from occurring by applying the method of the present invention described above with reference to FIG. 9.

More specifically, if the first MFP executes two-sided printing while the second MFP executes one-sided printing, the processing on the second surface of step S1113 and step S1117 in FIG. 9 can be omitted to advance to subsequent step. If both the first and the second MFPs execute one-sided printing, the present exemplary embodiment executes the above-described processing.

With the above-described configuration, the present exemplary embodiment can implement the printing apparatus capable of corresponding to two-sided printing and effectively preventing an overrun.

The present invention can also be achieved by providing a system or an apparatus with a storage medium storing software (program) implementing the functions of the exemplary embodiments and by reading and executing the software or the program in the storage medium with a computer of the system or the apparatus (a CPU or a micro processing unit (MPU)).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-297377 filed Dec. 28, 2009, which is hereby incorporated by reference herein in its entirety.

What is claimed is:

1. A printing system including a first printing apparatus configured to execute printing using a first color material and a second printing apparatus configured to execute printing using a second color material in which a paper discharge unit of the first printing apparatus and a paper feed unit of the second printing apparatus are mutually connected,
wherein the first printing apparatus comprises:
a generation unit configured to generate first print data and second print data based on input print data;
a transmission unit configured to transmit the second print data to the second printing apparatus; and
a transporting unit configured to generate first image data by executing image processing on the first print data, to print the first image data on a sheet using the first color material, and to transport the sheet having the first image data printed thereon from the paper discharge unit, and
wherein the second printing apparatus comprises:
a second printing unit configured to feed, from the paper feed unit, the sheet having the first image data printed thereon and having been transported from the transporting unit, to generate second image data by executing image processing on the second print data that has been generated based on same print data as the print data of the first print data on the sheet, and to print the second image data using the second color material, and
wherein the printing system comprises:
a comparison unit configured to estimate first time required for printing the first image data and second time required for generating the second image data and to compare the estimated first time and second time,
wherein the first printing apparatus starts printing of the first image data using the first color material without setting standby time in a case where the first time is longer than the second time, the first printing apparatus sets time until the second time passes to standby time and starts printing of the first image data using the first color material after the set standby time has passed in a case where the first time is shorter than the second time.

2. The printing system according to claim 1, wherein the first color material is either one of or a combination of a cyan color toner, a magenta color toner, a yellow color toner, and a black color toner, and the second color material is a clear toner.

3. The printing system according to claim 1, wherein the first print data is generated to be printed using the color toner, and the second print data is generated to be printed using the clear toner.

4. A printing apparatus comprising:
a generation unit configured to generate first print data and second print data based on input print data;
a printing unit configured to generate first image data by executing image processing on the first print data generated by the generation unit and to print the generated first image data on a sheet;
a transmission unit configured to transmit the second print data generated by the generation unit to another printing apparatus connected to the printing apparatus;
a conveyance unit configured, in order to print the second print data transmitted by the transmission unit, to convey the sheet having the first image data printed thereon by the printing unit to the another printing apparatus; and
a comparison unit configured to estimate first time required for printing the image data and second time required for generating the second image data and to compare the estimated first time and second time,
wherein the first printing apparatus starts printing of the first image data using the first color material without setting standby time in a case where the first time is longer than the second time, the first printing apparatus sets time until the second time passes to standby time and starts printing of the first image data using the first color material after the set standby time has passed in a case where the first time is shorter than the second time.

5. A method implemented by a printing system including a first printing apparatus configured to execute printing using a first color material and a second printing apparatus configured to execute printing using a second color material in which a paper discharge unit of the first printing apparatus and a paper feed unit of the second printing apparatus are mutually connected,
wherein the method implemented by the first printing apparatus comprises:
generating first print data and second print data based on input print data;
transmitting the second print data to the second printing apparatus; and
generating first image data by executing image processing on the first print data, printing the first image data on a sheet using the first color material, and transporting the sheet having the first image data printed thereon from the paper discharge unit, and
wherein the method implemented by the second printing apparatus comprises:
feeding, from the paper feed unit, the sheet having the first image data printed thereon and having been discharged from a discharging unit, generating second image data by executing image processing on the second print data that has been generated based on same print data as the print data of the first print data on the sheet, and printing the second image data using the second color material, and
wherein the method implemented by the printing system comprises:
estimating first time required for printing the first image data and second time required for generating the second image data and comparing the estimated first time and second time,
wherein the first printing apparatus starts printing of the first image data using the first color material without setting standby time in a case where the first time is longer than the second time, the first printing apparatus sets time until the second time passes to standby time and starts printing of the first image data using the first color material after the set standby time has passed in a case where the first time is shorter than the second time.

6. The method according to claim 5, wherein the first color material is either one of or a combination of a cyan color toner, a magenta color toner, a yellow color toner, and a black color toner, and the second color material is a clear toner.

7. The method according to claim 5, wherein the first print data is generated to be printed using the color toner, and the second print data is generated to be printed using the clear toner.

8. A method for controlling a printing apparatus comprising:
generating first print data and second print data based on input print data;
generating first image data by executing image processing on the generated first print data and printing the generated first image data on a sheet;
transmitting the generated second print data to another printing apparatus connected to the printing apparatus;
conveying the sheet having the first image data printed thereon, in order to print the transmitted second print data, to the another printing apparatus;
estimating first time required for printing the first image data and second time required for generating the second image data and comparing the estimated first time and second time,
wherein the first printing apparatus starts printing of the first image data using the first color material without setting standby time in a case where the first time is longer than the second time, the first printing apparatus sets time until the second time passes to standby time and starts printing of the first image data using the first color material after the set standby time has passed in a case where the first time is shorter than the second time.

9. Computer-executable instructions which, when executed by a computer, cause the computer to perform operations according to claim 5.

* * * * *